US008554595B2

(12) United States Patent
Jones, Jr. et al.

(10) Patent No.: US 8,554,595 B2
(45) Date of Patent: Oct. 8, 2013

(54) SYSTEMS AND METHODS FOR PROVIDING CONTROLS FOR AGGREGATED WEATHER-BASED WORK

(75) Inventors: Raymond P. Jones, Jr., Sandy, UT (US); Gregory G. Gonzales, Salt Lake City, UT (US); Michael L. Edwards, Cottonwood Heights, UT (US); Douglas S. Haymore, II, Sandy, UT (US)

(73) Assignee: Symbiot Business Group, Inc., Sandy, UT (US)

( * ) Notice: Subject to any disclaimer, the term of this patent is extended or adjusted under 35 U.S.C. 154(b) by 0 days.

(21) Appl. No.: 13/187,364

(22) Filed: Jul. 20, 2011

(65) Prior Publication Data

US 2013/0024336 A1    Jan. 24, 2013

(51) Int. Cl.
*G06Q 10/00*    (2012.01)
(52) U.S. Cl.
USPC .......................................................... 705/7.11
(58) Field of Classification Search
USPC .......................................................... 705/7.11
See application file for complete search history.

(56) References Cited

U.S. PATENT DOCUMENTS

| | | | | |
|---|---|---|---|---|
| 5,930,743 | A * | 7/1999 | Warren | 702/166 |
| 7,693,623 | B2 * | 4/2010 | Fox et al. | 701/19 |
| 2001/0049563 | A1 * | 12/2001 | Addink et al. | 700/19 |
| 2003/0023610 | A1 * | 1/2003 | Bove et al. | 707/101 |
| 2003/0149607 | A1 | 8/2003 | Ogasawara et al. | |
| 2004/0049439 | A1 * | 3/2004 | Johnston et al. | 705/34 |
| 2005/0279069 | A1 * | 12/2005 | Novembri et al. | 56/13.1 |
| 2007/0192218 | A1 * | 8/2007 | Licardi et al. | 705/30 |
| 2007/0277403 | A1 * | 12/2007 | Summer | 37/234 |
| 2008/0086321 | A1 * | 4/2008 | Walton | 705/1 |
| 2008/0086497 | A1 * | 4/2008 | Wallace et al. | 707/102 |
| 2008/0175356 | A1 * | 7/2008 | Seidberg et al. | 379/45 |

(Continued)

FOREIGN PATENT DOCUMENTS

| | | |
|---|---|---|
| CA | 2410194 A1 | 8/2003 |
| JP | 2005290886 | 10/2005 |

OTHER PUBLICATIONS

John Sonderegger. Technology will play role in St. Peters' snow removal data collection, radar are among methods the city will employ. St.Louis Post—Dispatch. Dec. 17, 1998:1-1. Available from: http://search.proquest.com.*

(Continued)

*Primary Examiner* — Lynda Jasmin
*Assistant Examiner* — George H Walker
(74) *Attorney, Agent, or Firm* — Kirton | McConkie; Michael F. Krieger

(57) ABSTRACT

Systems, methods, non-transitory computer-readable media storing computer program instructions for causing a computer device to implement methods, and the like utilize weather information from one or a variety of locations to estimate costs for providing weather-dependent work, and to provide financial controls for weather-dependent work allegedly performed. One method includes utilizing historical weather information relating to performance of weather-dependent work at a work location to generate an estimate of an anticipated frequency with which weather-dependent work will be necessary, utilizing information to estimate an anticipated cost per incident for performing weather-dependent work at the selected work location, and using such information at a plurality of locations to generate an aggregate bid for performing weather-dependent work at the locations. Weather information is also used to audit weather-dependent work allegedly performed at the work locations to provide financial controls to the aggregated weather-dependent work in compliance with law and regulation.

6 Claims, 4 Drawing Sheets

(56) References Cited

U.S. PATENT DOCUMENTS

2010/0057510 A1* 3/2010 Stevens et al. .................... 705/7
2011/0106727 A1* 5/2011 Noyes ........................ 705/36 R
2012/0203382 A1* 8/2012 Nourian ........................ 700/284

OTHER PUBLICATIONS

Arens, Edward A; Flynn, Larry E; Nall, Daniel N; & Ruberg, Kalev. (1980). Geographical extrapolation of typical hourly weather data for energy calculation in buildings. UC Berkeley: Center for the Built Environment. Retrieved from: http://escholarship.org/uc/item/7pc2q3vx.*

Program Evaluation and Audit, Metropolitan Council, Minnesota. "Metro Transit Snow Removal Contracts Review." Jan. 1, 2011. Downloaded Sep. 21, 2012 from http://councilmeetings.metc.state.mn.us/audit/2011/020911/11-A05.pdf.*

Sisiopiku, V.P.; , "Winter road maintenance-ITS options," Intelligent Transportation Systems Proceedings, Aug. 2001 pp. 298-302, doi: 10.1109/ITSC.2001.948672 URL: http://ieeexplore.ieee.org/stamp/stamp.jsp?tp=&arnumber=948672&isnumber=20514.*

Weather Warehouse website Jun. 2010, accessed via http://web.archive.org/.*

Baigorria, G.A., W.T. Bowen, and J. Stoorvogel. 2001. Estimating the spatial variability of weather in mountain environments. In: International Potato Center (Ed). Scientist and farmer: partners in research for the 21st century. CIP Program Report 1999-2000. Downloaded Sep. 21, 2012 from cipotato.org/publications/program_reports/99_00/46weather.* http://www.smartserviceinfo.com/products/industries/service/snow_removal_service_software.html, accessed Aug. 10, 2011.

http://www.rmtracking.com/blog/2010/02/17/gps-tracking-improves-snow-removal-in-buffalo/, accessed Aug. 10, 2011.

http://plowtrax.home.comcast.net/~plowtrax/docs/PlowTraxHowStormDefsWork.html, accessed Aug. 10, 2011.

* cited by examiner

SYSTEMS AND METHODS FOR PROVIDING CONTROLS FOR AGGREGATED WEATHER-BASED WORK

CROSS-REFERENCE TO RELATED APPLICATIONS

This application is related to co-filed pending patent application Ser. No. 13/187,352, filed Jul. 20, 2011 titled "Systems and Methods for Weather-Based Estimation, Auditing, and Exception Reporting," which is incorporated herein in its entirety by reference for all it discloses.

BACKGROUND OF THE INVENTION

1. Field of the Invention

The present invention relates to weather-dependent seasonal work, and more particularly to systems and methods for providing financial controls related to weather-based seasonal work.

2. Background and Related Art

Weather-based or weather-dependent seasonal work is necessary in many areas. For example, in many locations, it can be necessary to provide for landscaping and lawn care to ensure that a business remains presentable to its customers at all times. Similarly, in locations where snowfalls occur, it can be necessary to provide for snow removal, ice control, and the like to ensure that customers of a business are able to access the business and/or are not subject to dangerous conditions while accessing the business. Thus, it can be important for businesses to ensure that weather-based seasonal work or weather-dependent seasonal work is performed properly and in a timely fashion.

The performance of weather-dependent or weather-based work can be quite costly to a business. In many instances, however, the performance of weather-based or weather-dependent work is simply one of the costs of doing business; if the weather-based or weather-dependent work is not performed, the loss to business is greater than the cost of performing the weather-dependent work. Regardless of the necessity of performing the work, businesses often wish to obtain the benefit of less-costly manners of performing such work. Costs can be reduced in several ways, and one of the ways in which costs can be reduced is through consolidating contracts for performance of the work, such as at multiple business locations together and through competitive bidding processes.

While contracting for performance of weather-dependent work at multiple locations through a competitive bidding process has potential to significantly reduce costs associated with performance of the weather-dependent work, there are significant hurdles that have traditionally prevented adoption of such practices. One such hurdle is the Sarbanes-Oxley Act of 2002. Under the Sarbanes-Oxley Act, publicly-traded businesses that incur material costs must have adequate controls in place to ensure that incurred costs are proper and are properly accounted for. Meanwhile, costs that are not material do not have such requirements.

Large publicly-traded businesses that might wish to take advantage of cost savings by consolidating their weather-dependent work have found the requirements imposed by the Sarbanes-Oxley Act make it difficult to proceed with such consolidation. Instead, the businesses have allowed the weather-dependent work to be performed piecemeal under the direction and discretion of local divisions of the business. In this way, the weather-dependent work for each location of the business is handled locally and therefore does not amount to a material cost subject to the requirements of the Sarbanes-Oxley Act.

For example, a national bank having many branches commonly allows the manager of each branch to contract for any weather-dependent work necessary at the branch. As the local costs for performing weather-dependent work are handled locally, the cost is not deemed a material cost to the national bank, and the controls and reporting requirements of the Sarbanes-Oxley Act are not implicated. Even though the national bank avoids the difficulty and cost of compliance with Sarbanes-Oxley, the national bank essentially trades that cost for a different one inherent in the system for local handling of local work. Specifically, the national bank lacks oversight and control over the locally-performed work. For example a local bank manager may hire a friend or relative to perform the weather-dependent work at rates higher than necessary. Additionally, the national bank forgoes the cost savings that could potentially be achieved through consolidation of the work.

Even in instances where a national business might be willing to comply with the requirements of Sarbanes-Oxley and obtain weather-dependent work on a consolidated basis, the weather-dependent work industry is so fractured as to make consolidation extremely difficult to achieve in a way that provides any real cost benefit. Much weather-dependent work (e.g. snow removal, lawn care) is performed by local small businesses, often on a seasonal basis. Many such small businesses only operate or offer services during certain times of the year, or are involved in other services during an off-season for the weather-dependent work. In some instances, weather-dependent work necessary in one season must be obtained from a different source than the source of weather-dependent work necessary in another season. The net result is that any potential consolidation of weather-dependent work is extremely complex. An entity wishing to bid on weather-dependent work on a large scale is therefore required to construct its bid based on a bottom-up pricing model, obtaining sub-bids from many individual sources and constructing the overall bid accordingly.

BRIEF SUMMARY OF THE INVENTION

Implementation of the invention provides various systems, methods, non-transitory computer-readable media storing computer program instructions for causing a computer device to implement methods, and the like to utilize weather information from one or a variety of locations to estimate costs for providing weather-dependent work, and to provide financial controls for weather-dependent work allegedly performed. Implementation of the invention can utilize a variety of stand-alone and networked computer systems, sensors, weather information sources, and historical data to provide such functions.

One exemplary method is provided for estimating costs to perform weather-dependent work at a plurality of work locations. The method includes utilizing a weather information source providing historical weather information relating to a historical need for performance of weather-dependent work at a selected work location of the plurality of work locations to generate an estimate of an anticipated frequency with which weather-dependent work will be necessary at the selected work location, utilizing information about conditions at the selected work location and information about the cost of performing weather-dependent work in the area of the selected work location to estimate an anticipated cost per incident for performing weather-dependent work at the selected work location, repeating the steps of generating an estimate of the anticipated frequency of performing weather-dependent work and estimating an anticipated cost per incident for performing weather-dependent work for all of the plurality of work locations, and generating an aggregate bid for performing weather-dependent work at all of the plurality of work locations based on the anticipated frequency of performing weather dependent work and the anticipated cost per incident for performing the weather-dependent work at each of the plurality of work locations.

As part of this process, the method may also include locating a plurality of weather information sources providing weather information potentially corresponding to the work locations, and determining a best correlation between the weather information of each weather information source and work history data for each work location. The best correlation is utilized in generating the anticipated frequency of performing weather-dependent work at each work location.

In at least some implementations, an estimate of an actual area on which weather-dependent work will be necessary is generated. Generating an estimate of an actual area on which work will be necessary may include obtaining imagery of the work location depicting the actual area on which work will be necessary, and deriving, from the imagery, the estimate of the actual area in which weather-dependent work will be necessary. The imagery may include satellite and other imagery, such as aerial and street-level imagery. In at least some implementations, obtaining the imagery, and estimation of the actual work area are automatically performed. In some implementations, the estimate of the actual work area is manually reviewed or originally obtained manually.

In some circumstances, when the estimate of the actual area in which weather-dependent work will be necessary cannot be determined with sufficient certainty, a request is made for an in-person estimate of the cost for performing weather-dependent work at the selected work location. In some implementations, information about the complexity of performing weather-dependent work at the selected work location may be incorporated into the estimation and bidding process.

In some implementations, the method further includes monitoring the weather information source for current weather information related to a current need for weather-dependent work at the plurality of work locations, and using the current weather information to evaluate work invoiced by one or more service providers providing current weather-dependent work at the plurality of work locations. The evaluation may include auditing a bill for weather-dependent work allegedly performed at the plurality of work locations by the service providers, and/or detecting a situation where weather-dependent work should have been performed but was not yet invoiced by the service providers.

Another exemplary method is provided for auditing invoiced weather-dependent work at a work location. The method includes locating a weather information source providing weather information indicative of a need to perform weather-dependent work at a work location, receiving an invoice for weather-dependent work allegedly performed at the work location, and evaluating the invoice for weather-dependent work allegedly performed at the first location in light of the weather information near the time of alleged performance of the weather-related work at the work location to determine a likelihood that the weather-related work was necessary and actually performed.

When an evaluation of the weather-dependent work allegedly performed at the work location in light of the weather information is indicative that the weather-dependent work was not necessary, a hold may be placed on paying for the weather-dependent work allegedly performed at the work location until a service provider can prove that the weather-dependent work was necessary and was performed.

Another exemplary method is provided for providing controls related to weather-dependent work at a first location. The method includes locating a first weather information source providing weather information relating to a second location, the second location being estimated to have weather similar to weather occurring at the first location, and determining a correlation between the weather information relating to the second location and a need for weather-dependent work at the first location by comparing weather history data relating to the second location from the first weather information source to work history data for weather-dependent work at the first location. The method further includes monitoring the first weather information source for current weather information related to possible weather-related events suggesting a need for weather-dependent work at the first location, recording possible weather-related events suggesting a need for weather-dependent work at the first location, determining whether an invoice for weather-dependent work at the first location has been received corresponding to all recorded possible weather-related events, notifying a service provider of weather-dependent work at the first location when no invoice for weather-dependent work at the first location has been received corresponding to any possible weather-related event suggesting a need for weather-dependent work at the first location, and auditing the invoice for weather-dependent work at the first location when the invoice is received.

In some such implementations, a service provider can be notified of a potential need to perform weather-dependent work at a time proximate to a detected weather event. In some implementations, the service provider is notified of a potential need to perform weather-dependent work only when the service provider has not checked in within a certain time frame after detection of the detected weather event.

Another exemplary system is provided for use in verification of services performed in a large scale service provider environment. The system provides a weather observation and reporting site, a computer in communication with said weather observation and reporting site to either receive reports when a preset parameter is reached or to review regular reports from the site and determine when a preset parameter has been received, a service period in which it has been determined that a service provider should notice the weather has reached said preset parameter and responded by performing for a client a snow removal service, and a computer generated communication sent to the client requesting a response to a query regarding whether the snow removal service was performed and whether it was satisfactory.

Implementation of the invention includes systems to implement methods such as these and variations thereon, including a variety of stand-alone and networked computer systems. The foregoing summarized methods are intended to illustrate features of implementations of the invention, and are not to be deemed limiting of the various implementations of the invention.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
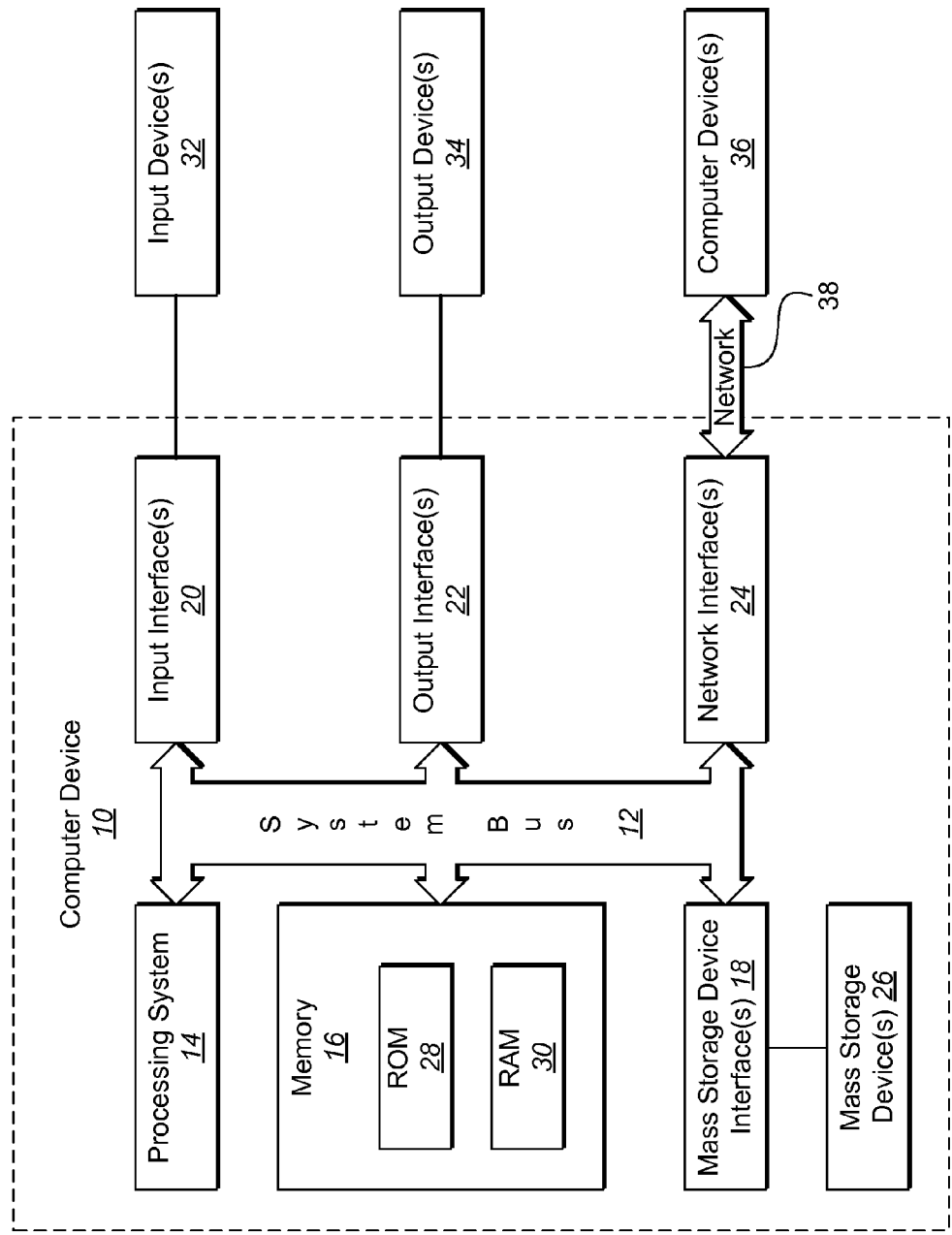
FIG. 1 shows a depiction of a representative computer system that may be used with embodiments of the invention.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Embodiments of the invention provide various systems, methods, non-transitory computer-readable media storing computer program instructions for causing a computer device to implement methods, and the like to utilize weather information from one or a variety of locations to estimate costs for providing weather-dependent work, and to provide financial controls for weather-dependent work allegedly performed. Embodiments of the invention can utilize a variety of stand-alone and networked computer systems, sensors, weather information sources, and historical data to provide such functions.

One exemplary method is provided for estimating costs to perform weather-dependent work at a plurality of work locations. The method includes utilizing a weather information source providing historical weather information relating to a historical need for performance of weather-dependent work at a selected work location of the plurality of work locations to generate an estimate of an anticipated frequency with which weather-dependent work will be necessary at the selected work location, utilizing information about conditions at the selected work location and information about the cost of performing weather-dependent work in the area of the selected work location to estimate an anticipated cost per incident for performing weather-dependent work at the selected work location, repeating the steps of generating an estimate of the anticipated frequency of performing weather-dependent work and estimating an anticipated cost per incident for performing weather-dependent work for all of the plurality of work locations, and generating an aggregate bid for performing weather-dependent work at all of the plurality of work locations based on the anticipated frequency of performing weather dependent work and the anticipated cost per incident for performing the weather-dependent work at each of the plurality of work locations.

As part of this process, the method may also include locating a plurality of weather information sources providing weather information potentially corresponding to the work locations, and determining a best correlation between the weather information of each weather information source and work history data for each work location. The best correlation is utilized in generating the anticipated frequency of performing weather-dependent work at each work location.

In at least some embodiments, an estimate of an actual area on which weather-dependent work will be necessary is generated. Generating an estimate of an actual area on which work will be necessary may include obtaining imagery of the work location depicting the actual area on which work will be necessary, and deriving, from the imagery, the estimate of the actual area in which weather-dependent work will be necessary. The imagery may include satellite and other imagery, such as aerial and street-level imagery. In at least some embodiments, obtaining the imagery, and estimation of the actual work area are automatically performed. In some embodiments, the estimate of the actual work area is manually reviewed or originally obtained manually.

In some circumstances, when the estimate of the actual area in which weather-dependent work will be necessary cannot be determined with sufficient certainty, a request is made for an in-person estimate of the cost for performing weather-dependent work at the selected work location. In some embodiments, information about the complexity of performing weather-dependent work at the selected work location may be incorporated into the estimation and bidding process.

In some embodiments, the method further includes monitoring the weather information source for current weather information related to a current need for weather-dependent work at the plurality of work locations, and using the current weather information to evaluate work invoiced by one or more service providers providing current weather-dependent work at the plurality of work locations. The evaluation may include auditing a bill for weather-dependent work allegedly performed at the plurality of work locations by the service providers, and/or detecting a situation where weather-dependent work should have been performed but was not yet invoiced by the service providers.

Another exemplary method is provided for auditing invoiced weather-dependent work at a work location. The method includes locating a weather information source providing weather information indicative of a need to perform weather-dependent work at a work location, receiving an invoice for weather-dependent work allegedly performed at the work location, and evaluating the invoice for weather-dependent work allegedly performed at the first location in light of the weather information near the time of alleged performance of the weather-related work at the work location to determine a likelihood that the weather-related work was necessary and actually performed.

When an evaluation of the weather-dependent work allegedly performed at the work location in light of the weather information is indicative that the weather-dependent work was not necessary, a hold may be placed on paying for the weather-dependent work allegedly performed at the work location until a service provider can prove that the weather-dependent work was necessary and was performed.

Another exemplary method is provided for providing controls related to weather-dependent work at a first location. The method includes locating a first weather information source providing weather information relating to a second location, the second location being estimated to have weather similar to weather occurring at the first location, and determining a correlation between the weather information relating to the second location and a need for weather-dependent work at the first location by comparing weather history data relating to the second location from the first weather information source to work history data for weather-dependent work at the first location. The method further includes monitoring the first weather information source for current weather information related to possible weather-related events suggesting a need for weather-dependent work at the first location, recording possible weather-related events suggesting a need for weather-dependent work at the first location, determining whether an invoice for weather-dependent work at the first location has been received corresponding to all recorded possible weather-related events, notifying a service provider of weather-dependent work at the first location when no invoice for weather-dependent work at the first location has been received corresponding to any possible weather-related event suggesting a need for weather-dependent work at the first location, and auditing the invoice for weather-dependent work at the first location when the invoice is received.

In some such embodiments, a service provider can be notified of a potential need to perform weather-dependent work at a time proximate to a detected weather event. In some embodiments, the service provider is notified of a potential need to perform weather-dependent work only when the service provider has not checked in within a certain time frame after detection of the detected weather event.

Another exemplary system is provided for use in verification of services performed in a large scale service provider environment. The system provides a weather observation and reporting site, a computer in communication with said weather observation and reporting site to either receive reports when a preset parameter is reached or to review regular reports from the site and determine when a preset parameter has been received, a service period in which it has been determined that a service provider should notice the weather has reached said preset parameter and responded by performing for a client a snow removal service, and a computer generated communication sent to the client requesting a response to a query regarding whether the snow removal service was performed and whether it was satisfactory.

FIG. 1 and the corresponding discussion are intended to provide a general description of a suitable operating environment in which certain embodiments of the invention may be implemented. One skilled in the art will appreciate that embodiments of the invention may be practiced by one or more computing devices and in a variety of system configurations, including in a networked configuration. However, while the methods and processes of the present invention have proven to be particularly useful in association with a system comprising a general purpose computer, embodiments of the present invention include utilization of the methods and processes in a variety of environments, including embedded systems with general purpose processing units, digital/media signal processors (DSP/MSP), application specific integrated circuits (ASIC), stand alone electronic devices, and other such electronic environments.

Embodiments of the present invention embrace one or more computer-readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer-readable media include random-access memory ("RAM"), read-only memory ("ROM"), programmable read-only memory ("PROM"), erasable programmable read-only memory ("EPROM"), electrically erasable programmable read-only memory ("EE-PROM"), compact disk read-only memory ("CD-ROM"), or any other device or component that is capable of providing data or executable instructions that may be accessed by a processing system. While embodiments of the invention embrace the use of all types of computer-readable media, certain embodiments as recited in the claims may be limited to the use of tangible, non-transitory computer-readable media, and the phrases "tangible computer-readable medium" and "non-transitory computer-readable medium" (or plural variations) used herein are intended to exclude transitory propagating signals per se.

With reference to FIG. 1, a representative system for implementing embodiments of the invention includes computer device 10, which may be a general-purpose or special-purpose computer or any of a variety of consumer electronic devices. For example, computer device 10 may be a personal computer, a notebook computer, a netbook, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer-readable media, such as on memory 16, a magnetic hard disk, a removable magnetic disk, a magnetic cassette, an optical disk, or from a communication connection, which may also be viewed as a computer-readable medium.

Memory 16 includes one or more computer-readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives, optical disk drives, and flash memory drives. A mass storage device 26 may read from and/or write to a magnetic hard disk, a removable magnetic disk, a magnetic cassette, an optical disk, flash memory, or another computer-readable medium. Mass storage devices 26 and their corresponding computer-readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, touch screen, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), an integrated circuit, a firewire (IEEE 1394), or another interface. For example, in some embodiments input interface 20 includes an application specific integrated circuit (ASIC) that is designed for a particular application. In a further embodiment, the ASIC is embedded and connects existing circuit building blocks.

One or more output interfaces 22 may be employed to connect one or more corresponding output devices 34 to system bus 12. Examples of output devices include a monitor or display screen, a speaker, a printer, a multi-functional peripheral, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
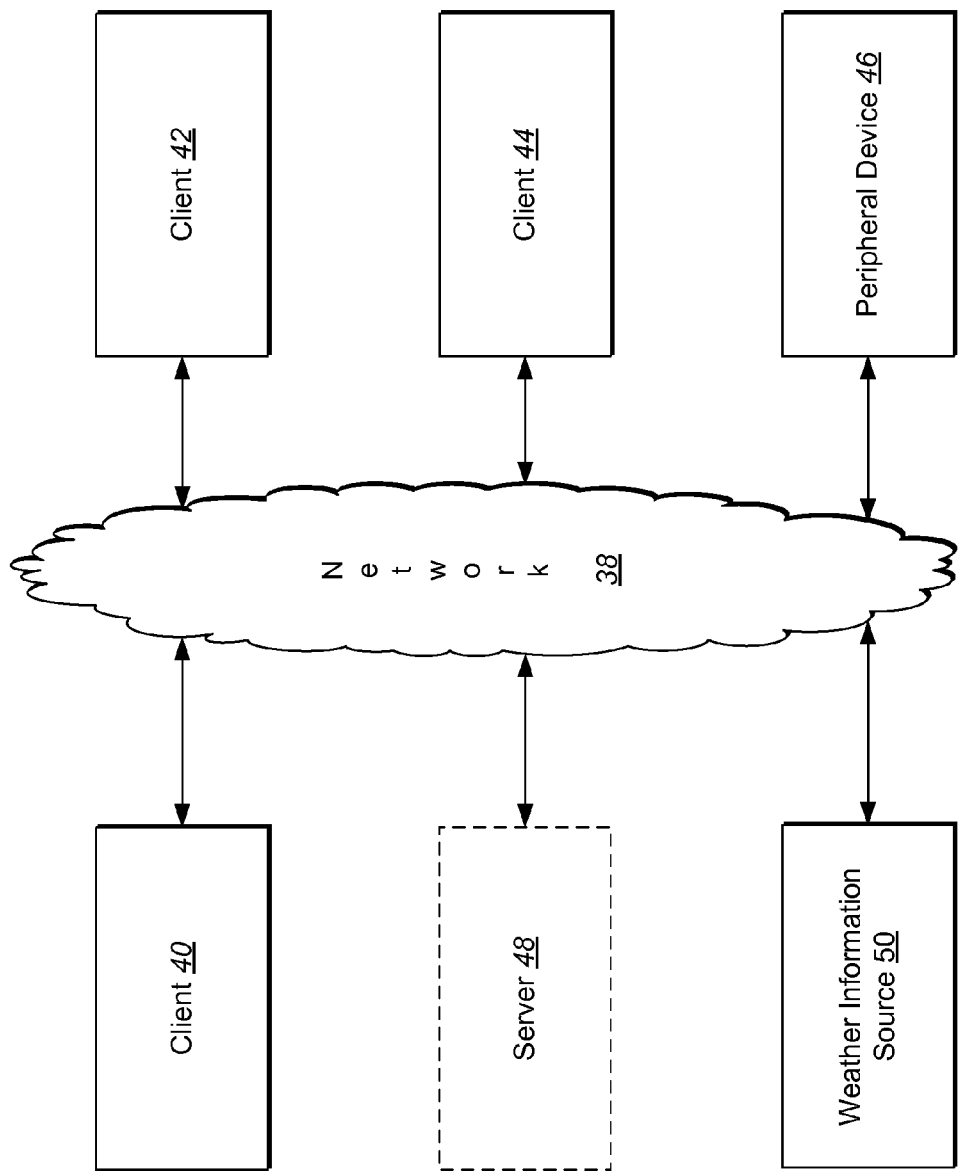
FIG. 2 shows a depiction of a representative networked computer system that may be used with embodiments of the invention.

Thus, while those skilled in the art will appreciate that embodiments of the present invention may be practiced in a variety of different environments with many types of system configurations, FIG. 2 provides a representative networked system configuration that may be used in association with embodiments of the present invention. The representative system of FIG. 2 includes a computer device, illustrated as client 40, which is connected to one or more other computer devices (illustrated as client 42 and client 44) and one or more peripheral devices (illustrated as multifunctional peripheral (MFP) MFP 46) across network 38. While FIG. 2 illustrates an embodiment that includes a client 40, two additional clients, client 42 and client 44, one peripheral device, MFP 46, and optionally a server 48, which may be a print server, connected to network 38, alternative embodiments include more or fewer clients, more than one peripheral device, no peripheral devices, no server 48, and/or more than one server 48 connected to network 38. Other embodiments of the present invention include local, networked, or peer-to-peer environments where one or more computer devices may be connected to one or more local or remote peripheral devices. Moreover, embodiments in accordance with the present invention also embrace a single electronic consumer device, wireless networked environments, and/or wide area networked environments, such as the Internet.

As depicted in FIG. 2, one or more weather information sources 50 is connected to the network 38. The weather information source 50 may be any type of weather information source at any level of complexity and providing any of a variety of information types and levels of detail. For example, the weather information source 50 may be or may include a news media source that provides weather information, such as a local or national news source. Alternatively or additionally, the weather information source 50 may be or may include one or more weather sensors or suites of weather sensors that provide particular types of weather information. The weather information source 50 may also be or include local human reports of actual or current weather conditions. The weather information source 50 may also be or include remote sensing data such as satellite data, radar data, and the like for a particular location. The weather information source 50 may be some hybrid of the foregoing potential sources of information, or any other current or future source of weather information.

The weather information source 50, whatever its type, may provide weather information on one of a variety of schedules from real time to near real time to periodically, but preferably provides weather information on a time schedule sufficiently detailed to permit its use for the estimation, auditing, and exception reporting purposes discussed herein. While FIG. 2 shows the weather information source 50 being connected to the network 38, it should be understood that the information provided by the weather information source 50 may be directly available over the network 38 or may be provided to the system in any other applicable fashion, including manual entry at any computer system connected to the network, or through a chain of computer systems (not shown). While one weather information source 50 is shown in FIG. 2, it should be understood that a plurality of weather information sources 50 may be incorporated into the system and it should further be understood that each weather information source 50 may provide weather information about one or more than one geographic locations.

Information obtained from the weather information source 50 can be used in conjunction with other information in various ways. For example, the information obtained from the weather information source 50 can be used to provide estimates of needs for future weather-dependent work at one or more geographic locations. Such information can be used by a aggregated or consolidated provider of weather-dependent work in conjunction with additional information as will be discussed herein in generation of estimates or bids to perform weather-dependent work on an aggregated or consolidated basis. The information obtained from the weather information source 50 facilitates the generation of consolidated estimates and bids for weather-dependent work in a top-down fashion not currently available.

The generation of consolidated estimates and bids for weather-dependent work in a top-down fashion allows a nationwide provider of weather-dependent work to contract for nationwide performance of the weather-dependent work at a fixed price. Although the nationwide provider of weather-dependent work may utilize employees to perform the weather-dependent work, the nationwide provider need not perform all the weather-dependent work using its own employees, but may utilize one or more contractors to perform a portion to all of the weather-dependent work. As the weather-dependent work may still be provided in various geographic locations that can be very distant one from another, including locations where it may not make sense to maintain employees to perform the weather-dependent work, the use of contractors may make sense for performance of the weather-dependent work in at least some locations. The top-down pricing model facilitated by certain embodiments of the invention allows the nationwide provider to know at what cost contractors to perform the weather-dependent work must be obtained, thereby further assisting the provider.

Additionally, the information obtained from the weather information source 50 can be used to facilitate auditing of expended costs, even on very large scales. For example, the information obtained from the weather information source 50 can be used to verify or confirm that weather conditions at a geographic location justified or dictated the performance of weather-dependent work such that when invoices, bills, or the like are received for allegedly-performed weather-dependent work, the alleged performance of weather-dependent work can be checked against corresponding weather condition information obtained from the weather information source 50. When the weather information confirms or provides sufficient certainty that invoiced weather-dependent work was necessary, corresponding payment(s) may be approved, and when sufficient certainty is lacking, requests for satisfactory verification of performed work and the need thereof can be requested and obtained prior to approving payment. In ways such as these, the use of information from the weather information source 50 provides controls of a type that complies with the requirements of Sarbanes-Oxley, thereby making available cost savings to national businesses that can be achieved through consolidation of the performance of weather-dependent work in ways not previously readily available due to the requirements of Sarbanes-Oxley.

As used herein, the term "weather-dependent work" should be understood to relate to any type of work, the need for which is dependent on or influenced by weather. For example, weather-dependent work may include snow removal work. Thus, weather information that is particularly applicable to determining a correlation between weather and weather events at the work location 54 for snow removal purposes may include any type of snowfall information and/or general precipitation and temperature information. In some instances, snow removal may need to be performed multiple times for a single snow event, or several snowfall events may occur in close time proximity, resulting in a need to perform snow removal multiple times in a single day or other time period. Thus, the weather information and information on a past need to perform snow removal at the work location 54 are correlated accordingly.

As another example, weather-dependent work may include landscaping work, such as planting, watering (such as where automatic watering systems are not used), lawn mowing, and the like. In this example, the weather information that may be applicable could be any weather or weather events that affect the need to perform the landscaping work. In some climates and instances, for example, cloudy and rainy weather may reduce the need to perform certain landscaping work or could dictate that such work be performed on a less-frequent time scale while in other climates, such weather may increase the need to perform or needed frequency of certain landscaping work. Thus, the weather information to be correlated with a need to perform weather-dependent work may include a great variety of weather information.

Figure 3:
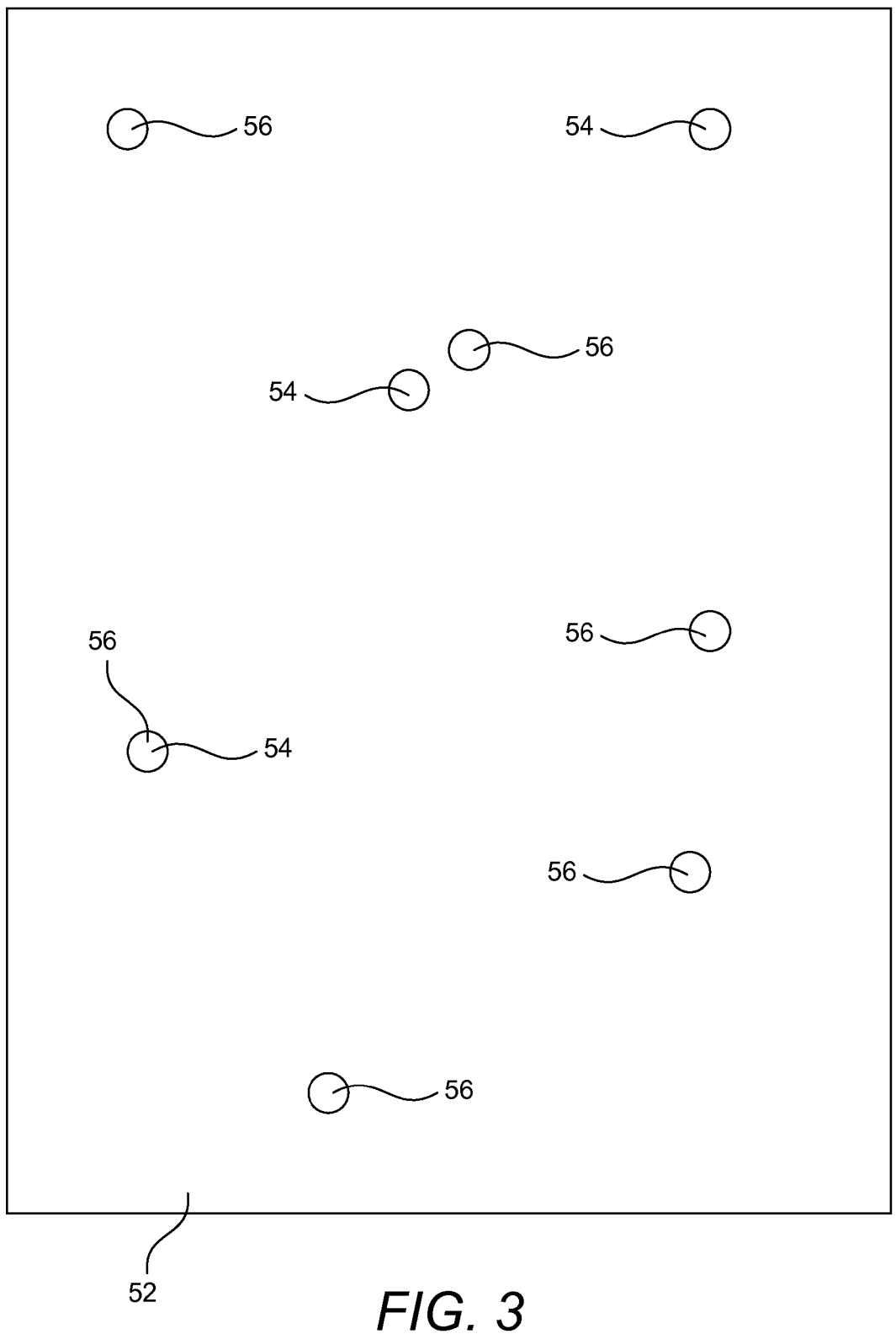
FIG. 3 shows a depiction of a representative map area showing representative work locations and weather information locations.

FIG. 3 depicts a representative portion of a map 52 of a representative geographic area for purposes of understanding certain embodiments of the invention. The map 52 of FIG. 3 depicts a variety of locations, each location being represented by a dot or circle. Some of the locations shown on FIG. 3 are work locations 54 and other locations are weather information locations 56. The work locations 54 are or are fairly representative of locations where weather-dependent work will, did, allegedly did, or could potentially occur. The weather information locations 56 are locations where weather information is available from one or more weather information sources 50. As illustrated in FIG. 3, the distance between each of the one or more work locations 54 may vary between the one or more weather information locations 56 by any distance, and indeed, a particular weather information location 56 may be located at or very close to the same location as one of the work locations 54.

Regardless of the proximity of the work locations 54 and the weather information locations 56, at least one of the weather information locations 56 is evaluated to determine a correlation between weather and weather events at a particular work location 54 and weather information provided by a weather information source 50 associated with the weather information location 56. Specifically, a correlation may be determined between past weather information provided by the weather information source 50 and weather and weather events at the work location 54 that have resulted in or are correlated with a need to perform weather-dependent work at the work location 54.

Alternatively, where information regarding weather and weather events at the work location 54 that have resulted in or are correlated with a need to perform weather-dependent work at the work location 54 is not available, a correlation between information regarding the weather information source 50 and information regarding the work location 54 may be made. For example, a correlation may be based on a variety of geographical features. As one example, a correlation may be based in whole or in part on elevation information between the work location 54 and the weather information location 56 in conjunction with a distance between the work location 54 and the weather information location 56. Additionally or alternatively, similarity of or proximity to any of a variety of weather-related geographical features may be utilized in generating the correlation. For example, weather-related geographical features may include bodies of water that may moderate temperatures or lead to "lake effect" snow. Weather-related geographical features may also include the presence of, direction of, and distance to mountains or hills. A correlation between the weather information location 56 and the work location 54 as discussed herein can be made using any or all of this information. A correlation may also be based in whole or in part on or may take account of local vegetation similarities and differences at the work location 54 and the weather information location 56.

While it may seem that weather information from a weather information source dealing with a particular weather information location 56 located in closest proximity to the work location 54 of interest would always be of most interest and would therefore have the highest correlation, it may be that the correlation between the need for weather-dependent work at the work location 54 and the weather information associated with the weather information location 56 in closest proximity will not be as good as the correlation at a more-distant location. Local climates and weather information can vary greatly from location to location. For example, a first weather information location 56 may be geographically closest to a particular work location 54, but may be shown to have significantly different weather due to factors such as common prevailing winds, differences in elevation, other geographic features (e.g. proximity to a mountain), differences in local shading, proximity to weather-moderating and/or weather-enhancing bodies of water, or for any of a variety of other reasons.

Thus, a correlation between weather information from a variety of weather information locations 56 and each work location 54 may be determined. A best fit one or more correlations between past work history at the work location 54 and weather information from one or more weather information locations 56 and/or a best fit one or more correlations based on other information is then used for purposes of determining what weather information will be used for various purposes in accordance with certain embodiments of the invention. For example, the correlation may be used by a national or regional provider bidding on provision of weather-dependent work to estimate a future need for weather-dependent work at the work location 54 to generate a most-accurate bid. The correlation may also be used to provide controls for the provision of weather-dependent work, for example for compliance with Sarbanes-Oxley, such as for auditing weather-dependent work at the work location 54, and for exception reporting with respect to weather-dependent work anticipated to have occurred at the work location 54 but not invoiced.

In many instances, simply knowing past weather information may be insufficient for a provider of consolidated weather-dependent work to accurately generate desired estimates or bids for the provision of the weather-dependent work. For example, as discussed above, the provider may not have employees available in every geographic location to provide the weather-dependent work, and in some instances may not have any employees providing the weather-dependent work. In such instances, the provider may utilize or may desire to utilize various contractors or other entities to perform some or all of the weather-dependent work. In instances where contractors are to be used, it may be desirable to be aware of current and/or anticipated rates for performance of the desired weather-dependent work.

The current and/or anticipated rates for performance of the desired weather-dependent work may vary from location to location. For example, rates may be higher for certain types of weather-dependent work in urban areas due to cost-of-living, rent costs, and other concerns. Similarly, rates may be higher for certain types of weather-dependent work in sparsely-populated areas due to increased fuel costs dictated by travel distances between anticipated locations of weather-dependent work. The current and/or anticipated rates for performance of the desired weather-dependent work may also vary based on the anticipated amounts of the weather-dependent work that can be aggregated to a single contractor or other local provider. Similarly, the current and/or anticipated rates and the range thereof may vary based on the number of contractors available and the level of competition existing within a certain area.

Not all contractors will provide identical services at identical rates, so information may be gathered regarding a range of rates available in different areas of interest. Rates for performance of weather-dependent work may be expressed in a variety of different fashions, including per unit area (e.g. the size of a parking lot to be cleared of snow and ice, the size of a lawn to be mowed, etc.), per occurrence (e.g. a flat base fee per push of snow clearing, etc.), per intensity (e.g. a total depth of snowfall over a certain period of time), or any combination of these or other concerns. Different contractors or other entities may calculate or express their rates using different methods, and when using such information, it is important to understand and take into account the manner in which the rates are expressed. As information about current and anticipated rates is accumulated to facilitate providing a top-down bid for large-scale performance of weather-dependent work, such as to a large publicly-traded company, the information may be organized and stored in an appropriate and accessible way, such as on a database.

In some instances, current and/or anticipated rates for a particular area may not be readily directly available. For example, contractors in a particular area may be unwilling to disclose their rates for whatever reason. Alternatively, contractors in a particular area may be unreachable or may not have their rates disclosed in a way that is reasonable obtainable within the time and other constraints available for obtaining rate information. Further alternatively, an aggregate provider may be unable to locate contractors willing and able to perform weather-dependent work in a particular area, such as due to a lack of advertising by any contractors in a particular area, which may be the case during an off season for the applicable weather-dependent work.

In other instances, the current and/or anticipated rates that are obtained for a particular area may appear to be unexpected. For example, research conducted into current and/or expected rates for a particular location may discover rates to be significantly higher than might otherwise be expected. Alternatively, research related to a different location may discover rates to be significantly lower than might otherwise be expected.

In instances where rates are unavailable or are significantly lower or higher than might otherwise be expected, various responses may be taken to ensure that the aggregate provider is able to compile an accurate top-down bid or quote at which it will be able to have the work performed by contractors while still achieving a profit. As one example, such situations may be flagged for further review. As another example, such situations may be automatically handled. Upon further review or with automatic handling, a variety of actions could be taken. For example, if the work location(s) 54 affected by the rate information or lack thereof are comparatively minor or few in number, the rate information or lack thereof might be essentially ignored and average or comparable data may be used. As another example, additional steps may be taken to obtain accurate rate information, such as additional efforts to locate available contractors. As still another example, applicable rate information may be derived, such as by evaluating any of a variety of factors to equate or correlate known rate information from one location where information is known to the location of interest. Such factors could include similarities in income, geography, demographics, or any other applicable factors.

The information regarding current and/or anticipated rates for performance of the weather-dependent work can be helpful in conjunction with the weather information obtained from the weather information source 50 to allow the aggregate service provide to generate a bid or quote, but in some instances still further information may be needed to permit accurate bids or quotes for the performance of the weather-dependent work. For example, in many instances, the cost of performing weather-dependent work such as snow removal or lawn care is dependent in whole or in part on the amount of work that will be performed at each work location 54. Thus, the cost for performing snow removal on a small parking lot may be significantly different from the cost for performing snow removal on a large parking lot. Of course, the difference in cost may be greater in some instances than others, based on the rate information in each instance.

In certain embodiments of the invention, modern technology may be leveraged to facilitate obtaining information about the amount of anticipated work that will be performed at each work location 54. In many instances, an evaluation is made as to the amount of work that will be performed for each instance of weather-dependent work (e.g. how much area must be cleared for each instance of snow removal), while in other instances, the evaluation may be made with respect to a total amount of work to be performed at a particular work location 54. In still other instances, an evaluation may be made as to both a total amount of work as well as a per-instance amount of work.

In a bottom-up method of evaluating the cost for performing work at a particular location, a typical method for evaluating work to be performed might involve a contractor visiting the location and physically measuring the site in determining the cost for performing the weather-dependent work. While such methods may be used and are embraced by certain embodiments of the invention, and may even be required in certain circumstances or at certain locations to ensure accurate information for preparing an estimate or bid, such methods involve certain inherent difficulties. There may be significant cost involved in performing on-site evaluations, especially where on-site evaluations are to be performed at multiple locations for a large bid package to be put together for an aggregate service provider who is not even guaranteed to obtain a contract to perform the weather-dependent work. Additionally, where an aggregate service provider is attempting to accumulate information to prepare an accurate bid, the aggregate service provider may not even have contracted with contractors in many or all of the various locations. Thus, the cost for performing the measurement and evaluation must also include the cost of locating and engaging contractors to perform the measurement and evaluation.

Thus, in some embodiments of the invention, alternative mechanisms can be utilized to evaluate amounts of work to be performed at various work locations 54. For example, modern technology has made satellite and/or aerial photography of a variety of locations readily available, such as over the Internet. In many instances, such photography includes sufficient detail on known scales of reference to permit such photography to be used to determine or estimate actual areas where the weather-dependent work will occur. For example, with respect to snow removal, such photography may be used to generate estimates of the square footage of a parking lot at a particular location.

As another example, an area of lawn or other landscaping may be determined, along with an estimate of the complexity of the lawn (e.g. hills, curves, interruptions for flower beds and the like, etc.). Of course, it should be understood that any features that might be impactful on the cost of performing the weather-dependent work and that can be obtained or even estimated from the visual information included in the photography may be so obtained and used in estimating the anticipated cost to perform the weather-dependent work at a particular location. Depending on the quality of the photography, including any obscuring features such as trees and the like, the estimates so generated may vary in precision and/or accuracy, and any such estimates may include information such as notes explaining the quality of the estimates.

Visual information such as that obtained from satellite/aerial photography may be only one type of technologically available information that may be accessed in determining anticipated costs for performing weather-dependent work at a particular location. Other technologically available information that may be utilized may include topographical information which may be available in certain areas and may be used to anticipate sloped or hilly conditions that may increase the anticipated cost of performing weather-dependent work at a location. Additionally, in many locations, street-level photography has become increasingly available, and may be reviewed to evaluate conditions such as access, type of landscaping, topography, and any other considerations that may impact the anticipated cost of performing weather-dependent work at a location.

Evaluation of such technologically accessible sources of information may be performed manually, semi-automatically, or automatically. Partially or fully-automatic evaluation of technologically accessible sources of information may occur, for example, through automated evaluation of satellite photography where delineations between work areas and non-work areas are distinct and computer-recognizable. For example, where the weather-dependent work to be performed is snow removal, a computer might successfully determine what areas are parking lots where snow is to be cleared and what areas are not.

In some such circumstances, a computer system can evaluate conditions at a potential work address, determine that a work area can be determined, and could calculate the area accordingly. When the work area is saved or stored to the system, the computer could also save or store a determined reliability of the calculation, indicative of the computer's assurance that the determined work area is accurate. In some instances, imagery corresponding to the determination could also be stored, such as by storing a copy of the imagery with a boundary superimposed indicating the area determined by the system. Where the imagery used is copyrighted, the system could save a link to the location and the boundary and the image could be recalled and the boundary imposed on the image to be displayed to a user. At a later time, all or some portion of the computer-detected boundaries and calculations could be reviewed for accuracy and any changes made manually. As a particular example, a user could manually review all determinations having an accuracy determination below a certain threshold.

Where a manual review or initial manual determination is made (such as where a computer system cannot reliably determine the work area, or where all determinations are made manually), the system could display imagery to the user and could permit the user to interact with the system to input boundaries on the work area or enter any information that will assist in making an evaluation of the anticipated cost of performing the weather-dependent work. The work area and any input information can then be saved and used in determining the anticipated cost of performing the weather-dependent work at the location. As with the automated methods for determining information, the user's confidence in the determined information may be input and stored for use in generating the aggregate bid information or for later evaluation of whether an in-person evaluation is warranted.

Where area estimates and other cost-impacting information obtained through use of satellite or aerial photography or through use of any other technologically accessible information sources are of varying quality, any of various actions may be taken in response to estimates deemed of lower quality. Where accurate information is most critical, actual in-person estimates may be requested. Additionally or alternatively, any aggregated estimates generated using lower-quality information may result in an anticipated cost of performing the weather-dependent work that includes a range of cost estimates corresponding to the confidence level associated with the area estimates and other cost-impacting information. The final aggregate bid or estimate can then incorporate, be based on, and potentially include the various ranges for the various work locations 54 included in the aggregate bid.

As may be appreciated from the foregoing description, the cost and time savings available by accessing and utilizing technologically available information in these ways may result in significant savings in working up the aggregate bid. A single employee, working from a computer, can generate quite-accurate estimates of the costs for performing weather-dependent work at a great number of work locations 54 that are geographically distant from each other in a short amount of time and at a cost that may be significantly less than the amount of time and cost involved in performing a single in-person estimate. Additionally, further cost savings may be obtained through the user of fully-automated and semi-automatic estimates, where feasible. Finally, maximum flexibility may be retained in that in-person forms of estimating remain an option where necessary.

Figure 4:
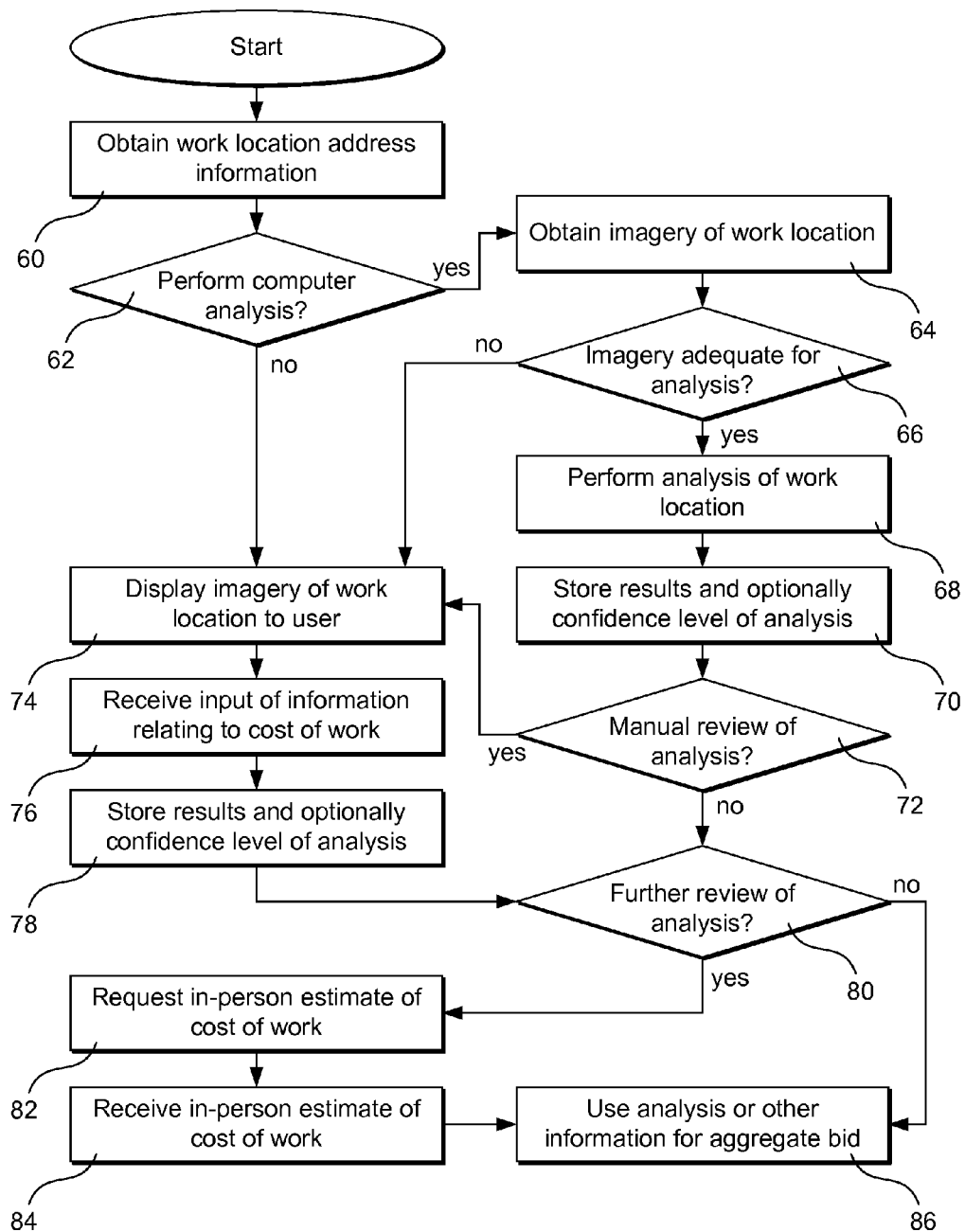
FIG. 4 shows a flowchart depicting methods in accordance with some embodiments of the invention.

FIG. 4 shows a flow chart illustrating methods in accordance with these principles. Execution begins with step 60, where information identifying a particular work location 54 is obtained, such as by entry of address information about the work location 54 into a computer system, or by obtaining information from a spreadsheet or database containing information about multiple work locations 54. At decision block 62, a determination is made as to whether to perform a computer-based or automated analysis of the work location 54. In embodiments where a computer-based or automated analysis of the work location 54 is not available, steps associated with decision block 62 may be omitted. If, however, a computer-based or automated analysis of the work location is to occur, execution proceeds to step 64, where imagery of the work location 54 is obtained, such as from public or private databases. While the discussion of FIG. 4 focuses on the use of imagery, it should be understood that other information types and sources may be used in addition to or in replacement of imagery of the work location 54.

At decision block 66, a determination is made as to whether the available imagery is adequate for the computer-based or automated analysis. The imagery may not be adequate, for example, if it is not at a known scale, if it lacks sufficient quality for the automated analysis, if it includes features that obscure the features of interest, or if the features of interest cannot be discerned from the imagery. If the imagery is adequate for the automated analysis, or if alternative imagery that is adequate can be obtained, execution proceeds to step 68, where an automated analysis of the work location 54 is performed. As discussed above, this analysis may include, for example, a determination of a work area (e.g. a parking lot surface area) where weather-dependent work is to be performed.

At step 70, the results of the analysis and optionally a confidence level associated with the results are stored by the system for potential later review as well as for use in preparing aggregate bids. Execution then proceeds to decision block 72, where a determination is made as to whether to conduct a manual review of the analysis of the particular work location. As may be appreciated, computer systems may perform steps 60 through 72 for numerous work locations quite rapidly in many instances, often without significant manual intervention.

If manual analysis of the work location 54 is desired for any reason, execution proceeds to step 74. Manual analysis of the work location may occur if, for example, no computer analysis is determined at decision block 62, if imagery is inadequate to perform an automated analysis, as determined at decision block 66, or if manual review of the automated analysis is deemed desirable at decision block 72. Manual analysis begins at step 74, where imagery of the work location 54 is displayed to the user. The imagery displayed to the user may have been obtained previously or may be obtained at the time the user interacts with the system. At step 76, the system receives input from the user relating to cost of performing weather-dependent work at the work location 54. For example, the input may include direct input of a cost estimate, an estimate of the work area at the work location 54, delineation of boundaries of the work area, or any other type of input, including a confidence level associated with the input information. At step 78, the results of the manual analysis and optionally any confidence level associated therewith are stored by the system.

Once manual analysis is complete or if no manual analysis is necessary after automated analysis, execution proceeds to decision block 80, where a determination is made as to whether further review of the analysis is needed. If, for example, the automated or manual analysis was unable to provide an estimate of the cost to perform the weather-dependent work at the work location 54 within a desired confidence level, execution proceeds to step 82, where a request is made for an in-person estimate of the cost of performing the weather-dependent work at the work location 54. At step 84, such an estimate is received back to the system, and execution proceeds to step 86, where the analysis and/or any other relevant information is used in preparation of the aggregate bid. Step 86 is also performed where no in-person analysis is necessary.

Processes similar to those of FIG. 4 may commonly be used to determine an anticipated cost for per-incident performance of weather-dependent work at work locations 54. When this anticipated cost information is used at step 86 in the generation of an aggregate bid, the anticipated cost information is utilized in conjunction with weather information, such as weather information from the weather information source(s) 50 that permits estimating the number of times weather-dependent work will need to be performed during a particular period of interest. Thus, with knowledge of the anticipated per-incident cost of performing the weather-dependent work and of the number of times that performance of weather-dependent work is anticipated to be necessary, the aggregate bid can be quite accurate. While it is anticipated that abnormal weather events will occur, abnormal weather events can be incorporated into the bidding process. Additionally, the aggregating of performance of weather-dependent work across potentially large geographic areas may minimize the effects of abnormal weather events, with increased costs in one area offset by reduced costs in another area.

The use of methods similar to those outlined in FIG. 4 allows an aggregate or consolidated service provider to quickly generate a competitive and accurate bid for the performance of weather-dependent work on essentially any scale for essentially any number of work locations 54 spread over essentially any geographic area with confidence that the work can be performed within the parameters of the bid while maintaining an adequate margin for the aggregate service provider. Such a bid is generated in a top-down fashion without requiring that the aggregate service provider retain or engage contractors in advance to perform the weather-dependent work before the aggregate service provider knows whether the bid is successful and accepted.

In the event the aggregate service provider's bid is accepted, the aggregate service provider is able to utilize the information generated as part of the process of creating the aggregate bid as it engages contractors or employees to perform the contracted weather-dependent work. Using at least some embodiments of the invention, the aggregate service provider is aware of its bid, the estimates for performing the weather-dependent work in each location, ranges of contractor costs in various locations, contact information for contractors, and the desired margins to be retained by the aggregate service provider. Armed with this information, the aggregate service provider is able to seek out contractors willing to perform the weather-dependent work within acceptable margins and/or to hire employees at acceptable wages to perform the weather-dependent work.

The foregoing is an example of one way in which weather information may be used in conjunction with providing aggregated weather-dependent work on large scales. As mentioned previously, the provision of weather-dependent work on large scales may result in significant savings to entities desiring performance of the weather-dependent work; however, the provision of weather-dependent work on a large-scale or aggregated basis may result in a material cost falling within the requirements of Sarbanes-Oxley, as discussed above. Therefore, at least some embodiments of the invention utilize weather information to provide features facilitating compliance with the requirements of Sarbanes-Oxley.

Specifically, at least some embodiments of the invention utilize weather information from the weather information source 50 or weather information sources 50 to provide and facilitate auditing of allegedly performed weather-dependent work and exception reporting in instances where it is expected that weather-dependent work was performed but has not been invoiced. Thus, the correlation between the various work locations 54 and weather information locations 56, in conjunction with the information provided by the weather information source(s) 50 may be used to provide controls to the system that permit publicly-traded companies obtaining the cost-saving benefits of aggregated performance of weather-dependent work in compliance with the requirements of regulations such as Sarbanes-Oxley.

With respect to auditing invoiced work, the aggregate service provider may receive an invoice for weather-related work alleged to have been performed by a contractor, worker, or the like. For example, an independent snowplow operator may be assigned to perform snow removal work at a certain work location 54 and may provide invoices of work performed from time to time to the aggregate provider that pays the contractor for the work. The invoice may be provided in any manner, such as paper or electronically, and includes dates and locations for all services provided by the contractor. The date and location information is used to audit the work allegedly performed by the contractor.

For example, an analysis may be performed based on weather-related information associated with the work location 54 for the allegedly-performed work to determine whether it was likely that weather conditions dictated a need for performance of the weather-related work. For example, if weather information indicates that no snow was received during a particular period of time, and an invoice is received for snow removal during that period of time, it is possible that the invoiced snow removal is fraudulent. Alternatively, there may simply be a mistake in the contractor's invoice, such as an incorrect date or location. As another alternative, as weather can sometimes vary even between locations not very distant from one another, it may be that the weather information does not reflect weather actually occurring at the invoiced work location 54.

Regardless, if an analysis of the invoice is indicative of a possibility of a fraudulent or mistaken invoice, a hold may be placed on paying on the potentially-fraudulent or mistaken invoiced work. The hold may prevent passing along costs to the entity paying the aggregate service provider. The hold may remain in place until the contractor has provided adequate assurances or evidence that the work was performed as invoiced. Alternatively, the hold may remain in place until a corrected invoice is submitted, such as with a correct date for the invoiced work. To permit the contractor to respond to the hold, a message informing of the hold may be sent to the contractor. All processes for evaluating and auditing invoices, placing holds, providing notice of holds, and removing holds may be performed automatically in at least some instances, or alerts relating to any such processes may be provided, such as by a computer system display, to a system operator to allow the system operator to accept or reject a hold, or to further evaluate whether a hold is appropriate.

In some instances, an audit of invoiced work may occur in multiple stages. For example, an initial audit may be performed based on weather information from a weather information source deemed to have a best correlation with a particular work location 54. If a potential error is detected based on the initial audit, a further audit may be performed using weather information from additional weather information sources or relating to different weather information locations 56. A further audit of this type may indicate a hold is not necessary if other weather information is indicative that the invoiced work was necessary, likely necessary, or at least potentially necessary. A further audit may detect localized weather patterns as well as situations where weather information from a particular source or relating to a particular weather information location 56 is incorrect or incomplete, such as due to a faulty sensor.

When performing exception reporting, weather information from a variety of sources may be monitored to detect weather conditions and events indicative of a need to perform weather-dependent work at one or more work locations 54. For example, automatic trigger levels may be set that are indicative of a need to perform weather-dependent work. With respect to snow removal, for example, a reported snowfall amount exceeding two inches may be chosen as a trigger indicative of a need to perform snow removal. Any time a snowfall amount exceeding this trigger level is detected, it may be presumed that weather-dependent work will be necessary at one or more work locations 54.

Exception reporting associated with detected trigger events may occur in a variety of fashions. In one example, contractors assigned to perform weather-dependent work at various locations may check in with the system to indicate that they are aware of a need to perform weather-dependent work and will perform the work. In the case where trigger events are detected and one or more contractors does not check in within a certain amount of time to indicate that the work will be performed, a notification may be sent to the one or more contractors (e.g. by e-mail, telephone call, text message, and the like) requesting that they check in or acknowledge the need to perform weather-dependent work. In the event that certain contractors do not check in, reassignments may be made among other contractors to ensure that all contracted work is performed. Actions such as these may reduce complaints from businesses needing weather-dependent work and ensure that the businesses are well served.

Another type of exception reporting may occur in association with auditing and evaluation of invoiced services. In one example, an invoice may be received that does not include weather-dependent work on a date where a trigger event was detected. When this occurs, a contractor assigned to provide the work can be notified or contacted regarding the potentially-missing work. The contractor may have made a mistake in the invoice that can thus be corrected to ensure proper payment. In addition, a correction can thus be made before work is billed to the end customer by the aggregate service provider, preventing a need for a later corrected invoice in the event the contractor later detects the error. Alternatively, the contractor may simply have discovered that local conditions varied from what was expected based on the weather information, and that weather-dependent work was not necessary. In such an instance, the contractor can indicate that the lack of invoiced work was correct.

Exception reporting may also be performed in instances where no invoice at all is received, even though it is expected that weather-dependent work was necessary and had occurred. A contractor, for example, may find himself occupied with other work and may neglect to provide an invoice for work performed. While the contractor may eventually anticipate invoicing for the work performed, the late invoicing of work performed may appear unprofessional when it results in late billing to the business where the work was performed. Thus, a notification may be provided to the contractor that weather-dependent work was expected on a certain date, that an invoice had not been received, and that an invoice is needed by a certain date or time to facilitate billing.

As may be appreciated, exception reporting in the fashion discussed above may be especially useful at or near the end of billing cycles. Exception reporting methods such as these facilitate timely billing for work performed, and ensures that contractors are timely paid for work they performed.

Weather information may also be used for verification services, similar in fashion to the performance of exception reporting discussed above. Verification services may improve customers' experience by ensuring that weather-dependent work such as snow removal is performed in a timely and satisfactory fashion. Thus, a computer system may be in communication with a weather information source such as a weather observation and reporting site. The computer system may receive reports from the weather information source when a preset weather-related parameter is met, such as a snowfall event of a certain magnitude. Alternatively, the computer system may receive regular reports from the weather information source and may independently determine when a preset parameter has been satisfied. As discussed previously, the weather information source may not directly report on weather conditions and events at a location of interest, and instead information about weather conditions at a location of interest may instead by derived from weather information obtained from one or more correlated weather information sources.

In embodiments of the system, it is to be assumed that service providers, such as those contracted to perform weather-dependent work at one or more work locations, will take note of weather conditions satisfying parameters indicative of a need to perform the weather-dependent work. For example, a snow-removal provider will be presumed to note when a snowfall event necessitating removal has occurred. The service provider will then be presumed to perform the weather-dependent work (e.g. snow removal). The weather-dependent work is performed on behalf of a client, and a client representative will typically be aware of whether the weather-dependent work has been performed in a timely and satisfactory manner. Therefore, a computer-generated message may be sent to the client representative requesting a response to a query as to whether the weather-dependent work was performed and whether the performance was satisfactory.

The computer-generated message may be sent using any combination of desired technologies. As one example, an e-mail may be generated and sent by the computer system. As another example, a SMS or text message may be sent by the computer system. As another example, an automated telephone call may be performed by the computer system. Essentially any communication method capable of automated performance by a computer may be utilized, and essentially any method corresponding method for receiving a response may be used, including computer-based and interactive-based methods. For example, a response may be received by text message, e-mail, telephone key entry, and the like. Additionally, the message may request that the client representative respond in a way that will utilize human interaction on behalf of the service provider, such as by a return phone call to customer service personnel.

The sending of a request for a response to a query regarding whether a weather-dependent service was performed in a timely and satisfactory manner serves to improve client relations and ensure client satisfaction with the aggregate service provider. It ensures that the clients and client representatives are aware of weather events that may result in a need for weather-dependent work and are striving to ensure that such work is performed when necessary. Thus, the automated request may include requests for multiple types of information. The request may include a request for confirmation that a need for weather-dependent work occurred. If such a need occurred, the request may also seek confirmation that the work was performed, whether the work was timely performed, and whether the work was satisfactorily performed, etc.

The information received in response may be used in various manners. For example, where an indication is received that weather-dependent work was not needed, models for predicting the need for weather-dependent work may be updated to reflect the response, or data may be accumulated for later updates accordingly. Similarly, where an indication is received that weather-dependent work was not performed, action may be taken to contact the local service provider to determine why the weather-dependent work was not performed and/or to ensure that the weather-dependent work will shortly be performed. Further contacts with the client representative may be made to apprise the client representative of any updates of the situation. In instances where the work was performed, but not in a satisfactory manner and/or not in a timely manner, the concerns of the client representative may be addressed with the service provider to improve future service and/or remediate unsatisfactory work where possible. If necessary, new contracted service providers may be located. All such actions may occur in automated, semi-automated, or manual fashions, as desired.

In some embodiments, communications with the local contracted service provider may be maintained until the service provider reports that the weather-dependent work has been performed or remediated. Alternatively, a work-completed communication may be received from the local service provider. Regardless, when the work has been completed, further communications with the client representative may be made. This furthers customer satisfaction by ensuring the client representative that the aggregate service provider is committed to customer satisfaction and will follow through to ensure performance of the weather-dependent work.

Some embodiments of the invention are configured to receive updates of services performed from the local service providers as the services are performed. Thus, when a determination has been made that a service Therefore, verification services in accordance with those discussed herein may be incorporated into any embodiment of the invention.

Embodiments of the invention are implemented with all the functions discussed above in an integrated fashion. Thus, for example, estimates are prepared based on past weather data and weather-dependent work information. Then, once weather-dependent work is undertaken, audits are performed on all invoiced work, and exception reporting occurs to ensure that all expected weather-dependent work is properly invoiced.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A non-transitory computer-readable medium storing computer program instructions for causing a computer device to implement a method for providing controls related to weather-dependent work at a first location, the method comprising:
   locating a first weather information source providing weather information relating to a second location, the second location being estimated to have weather similar to weather occurring at the first location;
   determining a correlation between the weather information relating to the second location and a need for weather-dependent work at the first location by comparing weather history data relating to the second location from the first weather information source to work history data for weather-dependent work at the first location;
   monitoring the first weather information source for current weather information related to possible weather-related events suggesting a need for weather-dependent work at the first location;
   recording possible weather-related events suggesting a need for weather-dependent work at the first location;
   determining whether an invoice for weather-dependent work at the first location has been received corresponding to all recorded possible weather-related events;
   notifying a service provider of weather-dependent work at the first location when no invoice for weather-dependent work at the first location has been received corresponding to any possible weather-related event suggesting a need for weather-dependent work at the first location; and
   auditing the invoice for weather-dependent work at the first location when the invoice is received.

2. A non-transitory computer-readable medium as recited in claim 1, further comprising notifying a service provider of a potential need to perform weather-dependent work at a time proximate to a detected weather event.

3. A non-transitory computer-readable medium as recited in claim 2, wherein the service provider is notified of a potential need to perform weather-dependent work only when the service provider has not checked in within a certain time frame after detection of the detected weather event.

4. A non-transitory computer-readable medium storing computer program instructions for causing a computer device to implement a method for providing controls related to weather-dependent work at a first location, the method comprising:
   locating a first weather information source providing weather information relating to a second location, the second location being estimated to have weather similar to weather occurring at the first location;
   determining a correlation between the weather information relating to the second location and a need for weather-dependent work at the first location by comparing weather history data relating to the second location from the first weather information source to work history data for weather-dependent work at the first location;
   monitoring the first weather information source for current weather information related to possible weather-related events suggesting a need for weather-dependent work at the first location;
   recording possible weather-related events suggesting a need for weather-dependent work at the first location;
   determining whether an invoice for weather-dependent work at the first location has been received by an aggregate service provider corresponding to all recorded possible weather-related events;
   notifying a localized service provider of a weather-related event suggesting a need for weather-dependent work at the first location when any invoice for weather-dependent work at the first location does not include an entry for weather-dependent work corresponding to the weather-related event suggesting the need for weather-dependent work at the first location.

5. A non-transitory computer-readable medium as recited in claim 4, further comprising notifying a local service provider of a potential need to perform weather-dependent work at a time proximate to a detected weather event.

6. A non-transitory computer-readable medium as recited in claim 5, wherein the local service provider is notified of a potential need to perform weather-dependent work only when the local service provider has not checked in within a certain time frame after detection of the detected weather event.

* * * * *